United States Patent [19]

Flockenhaus

[11] 4,235,851

[45] Nov. 25, 1980

[54] PROCESS FOR REDUCING THE NITROGEN OXIDE CONTENT OF COKE OVEN GASES

[75] Inventor: Claus Flockenhaus, Essen, Fed. Rep. of Germany

[73] Assignee: Didier Engineering GmbH, Essen, Fed. Rep. of Germany

[21] Appl. No.: 57,254

[22] Filed: Jul. 12, 1979

[30] Foreign Application Priority Data

Jul. 24, 1978 [DE] Fed. Rep. of Germany ....... 2832397

[51] Int. Cl.³ .............................................. B01D 53/34
[52] U.S. Cl. ..................................... 423/235; 202/140
[58] Field of Search ................. 423/235, 239; 202/140

[56] References Cited

U.S. PATENT DOCUMENTS

| 3,849,258 | 11/1974 | Flockenhaus et al. | 202/140 |
| 4,115,515 | 9/1978 | Tenner etal. | 423/235 |

FOREIGN PATENT DOCUMENTS

| 2550635 | 5/1976 | Fed. Rep. of Germany | 423/235 |
| 50-207711 | 2/1976 | Japan | 423/235 |
| 51-110731 | 9/1976 | Japan | 423/235 |
| 754698 | 8/1956 | United Kingdom | 423/235 |
| 917023 | 1/1963 | Japan | 423/235 |

Primary Examiner—G. O. Peters
Attorney, Agent, or Firm—Wood, Herron & Evans

[57] ABSTRACT

A process for reducing the nitrogen oxide content of coke oven gases by spraying ammonia or ammonia-containing water into the regenerator chambers of a coke oven where the coking oven waste gases are at a temperature of between 700° and 1100° C.

5 Claims, No Drawings

PROCESS FOR REDUCING THE NITROGEN OXIDE CONTENT OF COKE OVEN GASES

BACKGROUND OF THE INVENTION

This invention relates to coke forming processes and, more particularly, to the reduction of the nitrogen oxide content of coke oven gases.

Processes for reducing the nitrogen oxide content of coke oven gases are known to the art. These consist primarily of the catalytic reduction of nitrogen oxides with ammonia to nitrogen and water or of scrubbing the oven gases to remove the nitrogen oxides. However, neither process is particularly well suited for reducing the nitrogen oxide content of coke oven gases because of their cost.

SUMMARY OF THE INVENTION

This invention has among its principal objects to provide a process for effectively reducing the nitrogen oxide content of coke oven gases which is simple, reliable and which can be accomplished economically.

Further, this invention has among its objects to provide a process for reducing the nitrogen oxide content of coke oven gases by approximately 40 to 60% without the use of catalysts or gas scrubbing apparatus.

This invention is based in part upon the discovery that the nitrogen oxide content of coke oven gases can be reduced approximately 40 to 60% through a reaction at elevated temperatures between the nitrogen oxides and ammonia without the need of a catalyst. That is, it has been found that by injecting ammonia either as pure ammonia or as evaporated ammonia water into the regenerator at a level where the coke oven gases are in the range of 700° to 1100° C. that the concentration of nitrogen oxides in the gases can be substantially reduced. The injection of ammonia or ammonia water can be by means of injection lances through the regenerator at a level corresponding to the desired temperature range of the gases.

These and other objects of the present invention will be more fully appreciated by reference to the following detailed description of the invention.

DETAILED DESCRIPTION

Ovens used for the production of coke contain regenerator chambers through which the hot gases from the coking process are circulated to heat the walls thereof. These walls are typically made of a high temperature resistant refractory material such as refractory brick. The heat of the gases extracted in the regenerator chamber is then used to in part heat the coal in the ovens by circulating gases back through the hot regenerator chambers where they are heated and then around the ovens.

The production of coke in the ovens produces a waste or flue gas which contains a number of constituents including nitrogen oxides. It is highly desirable to remove these nitrogen oxides from the flue gases to prevent their emission to the atmosphere.

According to the present invention, the nitrogen oxide content of the coke oven gases is contacted with ammonia or evaporated ammonia water by spraying of ammonia or ammonia water into the regenerator. The spraying can be performed by means of injection lances extending through the regenerator wall. In accordance with the principles of this invention, a reaction takes place between the nitrogen oxides and the ammonia when the gases are at a temperature between 700° and 1100° C. Accordingly, the injection lances used to spray the ammonia or ammonia water extend into the regenerator at a level where the gases are within this temperature range. Preferably, the reaction is carried out at a temperature of 850° to 950° C. The gas reaction between the nitrogen oxides and the ammonia at this temperature is carried out by directly contacting the ammonia or evaporated ammonia water with the coke oven gases and without the presence of a catalyst. It has been found that the process of this invention permits the reduction of the nitrogen content by approximately 40 to 60%.

The use of evaporated ammonia water is particularly advantageous in the process of this invention because it is a by-product of the coking process and therefore is readily available at any coking plant. Its use thus contributes to the economy of this invention.

The present invention is particularly useful with partial recuperative ovens where the waste gas temperature is lowered only to about 900° C. In this case, the ammonia and/or ammonia water can be sprayed into the waste gas collecting channel since in the operation of the ovens the waste gas in the channel is within the preferred temperature range of this invention.

As may be seen, the process of this invention is simple, reliable and economical. No catalyst is required nor the employment of expensive and complicated waste gas scrubbing apparatus to reduce a substantial portion of the nitrogen oxides in the waste gas.

The present invention also admits a special design of the regenerator coking oven for the application of the process. That is, existing regenerator coking ovens can be retrofitted such that the ammonia and/or ammonia water is sprayed into the regenerator only in those cells to which waste gas is admitted.

I claim:

1. A process for reducing the nitrogen oxide content of the waste gases of a coking oven comprising the step of admixing ammonia or ammonia-containing water with the waste gases in the regenerator or recuperator cells of the coke oven at a heat zone containing the waste gases at a temperature between 700° and 1100° C.

2. The process of claim 1 wherein the ammonia or ammonia-containing water is injected at a point where the waste gases have a temperature between 850° and 950° C.

3. The process of claim 1 wherein the ammonia is sprayed into the regenerator chamber of the coking oven.

4. The process of claim 1 wherein the coking oven is a partial recuperative oven and wherein the ammonia or ammonia-containing water is injected into the waste gas collector channel of the oven, the gases having a temperature of about 900° C.

5. The process of claim 1 wherein the ammonia is injected only into those regenerator cells to which waste gas is admitted.

* * * * *